United States Patent
Hodgkinson et al.

(10) Patent No.: US 11,705,280 B2
(45) Date of Patent: Jul. 18, 2023

(54) MULTILAYER CAPACITOR HAVING OPEN MODE ELECTRODE CONFIGURATION AND FLEXIBLE TERMINATIONS

(71) Applicant: AVX Corporation, Fountain Inn, SC (US)

(72) Inventors: Frank Hodgkinson, Londonberry (GB); Elaine Boyle, Coleraine (GB)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 0 days.

(21) Appl. No.: 16/850,132

(22) Filed: Apr. 16, 2020

(65) Prior Publication Data

US 2020/0343046 A1    Oct. 29, 2020

Related U.S. Application Data

(60) Provisional application No. 62/838,406, filed on Apr. 25, 2019.

(51) Int. Cl.
*H01G 4/248* (2006.01)
*H01G 4/12* (2006.01)
(Continued)

(52) U.S. Cl.
CPC ............ *H01G 4/248* (2013.01); *H01G 4/012* (2013.01); *H01G 4/12* (2013.01); *H01G 4/30* (2013.01)

(58) Field of Classification Search
CPC ............ H01G 4/30; H01G 4/12; H01G 4/248; H01G 4/012; H01G 4/1209; H01G 4/232;
(Continued)

(56) References Cited

U.S. PATENT DOCUMENTS

| 5,021,921 A | 6/1991 | Sano et al. |
| 5,719,539 A | 2/1998 | Ishizaki et al. |

(Continued)

FOREIGN PATENT DOCUMENTS

| EP | 0 929 087 B1 | 5/2007 |
| JP | H 066105 A | 1/1994 |

(Continued)

OTHER PUBLICATIONS

AVX Product Information on MLCC with Flexiterm®, 207, 5 pages.

(Continued)

*Primary Examiner* — Michael P McFadden
(74) *Attorney, Agent, or Firm* — Dority & Manning, P.A.

(57) ABSTRACT

A multilayer ceramic capacitor may include a monolithic body and interleaved first and second pluralities of electrodes extending from the first and second ends, respectively, of the monolithic body towards opposite ends of the monolithic body. A first margin distance and a second margin distance may be formed, respectively, between the electrodes and the opposite ends of the monolithic body. First and second external terminations may be respectively disposed along the first end and second end of the monolithic body and respectively connected with the first and second plurality of electrodes. A margin ratio between a length of the monolithic body and the first margin distance and/or second margin distance may be less than about 10. At least one of the first external termination or the second external termination may include a conductive polymeric composition.

30 Claims, 4 Drawing Sheets

(51) Int. Cl.
*H01G 4/012* (2006.01)
*H01G 4/30* (2006.01)

(58) Field of Classification Search
CPC ... H01G 4/0085; H01G 4/1227; H01G 4/2325
See application file for complete search history.

(56) References Cited

U.S. PATENT DOCUMENTS

| | | | |
|---|---|---|---|
| 6,020,799 | A | 2/2000 | Ishizaki et al. |
| 6,304,156 | B1 | 10/2001 | Ishizaki et al. |
| 6,310,759 | B2 | 10/2001 | Ishigaki et al. |
| 6,587,327 | B1 | 7/2003 | Devoe et al. |
| 6,771,485 | B2 | 8/2004 | Yokoyama et al. |
| 6,816,356 | B2 | 11/2004 | Devoe et al. |
| 6,970,341 | B1 | 11/2005 | Devoe et al. |
| 7,068,124 | B2 | 6/2006 | White et al. |
| 7,085,124 | B2 | 8/2006 | Togashi |
| 7,177,137 | B2 | 2/2007 | Ritter et al. |
| 7,265,964 | B1 | 9/2007 | Togashi |
| 7,336,475 | B2 | 2/2008 | Bultitude et al. |
| 7,334,981 | B2 | 3/2008 | Ritter et al. |
| 7,463,474 | B2 | 12/2008 | Ritter et al. |
| 7,675,729 | B2 | 3/2010 | Anthony et al. |
| 7,715,173 | B2 | 5/2010 | Bultitude et al. |
| 7,843,679 | B2 | 11/2010 | Togashi |
| 7,859,821 | B2 | 12/2010 | Shimizu |
| 8,446,705 | B2 | 5/2013 | Ritter et al. |
| 8,576,538 | B2 | 11/2013 | Kuroda et al. |
| 8,780,523 | B2 | 7/2014 | Seo et al. |
| 8,885,319 | B2 | 11/2014 | Bultitude et al. |
| 9,087,648 | B2 | 7/2015 | Bultitude et al. |
| 9,099,245 | B2 | 8/2015 | Lee |
| 9,418,789 | B2 | 8/2016 | Lee et al. |
| 9,490,072 | B2 | 11/2016 | Bultitude et al. |
| 9,786,436 | B2 | 10/2017 | Itamura |
| 9,799,449 | B2 | 10/2017 | Hill et al. |
| 9,812,259 | B2 | 11/2017 | Lee et al. |
| 9,843,299 | B2 | 12/2017 | Ahn et al. |
| 9,847,173 | B2 | 12/2017 | Taniguchi et al. |
| 9,893,703 | B2 | 2/2018 | Ahn et al. |
| 9,899,151 | B2 | 2/2018 | Itamura |
| 9,997,295 | B2 | 6/2018 | Fujita et al. |
| 10,083,795 | B2 | 9/2018 | Itamura |
| 10,304,629 | B2 | 5/2019 | Kitamura et al. |
| 10,468,191 | B2 | 11/2019 | Yamada et al. |
| 10,943,735 | B2 | 3/2021 | Hom et al. |
| 2005/0248908 | A1 | 11/2005 | Dreezen et al. |
| 2010/0221124 | A1* | 9/2010 | Ikushima ............ F04B 43/0045 417/413.1 |
| 2012/0100217 | A1* | 4/2012 | Green ............... A61P 25/00 514/8.4 |
| 2012/0154977 | A1 | 6/2012 | Hur et al. |
| 2012/0297596 | A1 | 11/2012 | Bultitude et al. |
| 2013/0294006 | A1* | 11/2013 | Kang ............... H01B 1/22 977/734 |
| 2015/0022940 | A1* | 1/2015 | Han ............... H01G 4/30 252/514 |
| 2016/0227650 | A1* | 8/2016 | Teraoka ............ H01G 4/248 |
| 2018/0374646 | A1 | 12/2018 | Ward et al. |
| 2019/0115145 | A1* | 4/2019 | Kim ............... H01F 41/041 |
| 2019/0279819 | A1 | 9/2019 | Horn et al. |
| 2019/0304683 | A1* | 10/2019 | Terashita ............ H01G 4/232 |
| 2020/0243259 | A1 | 7/2020 | Berolini et al. |
| 2020/0243260 | A1 | 7/2020 | Berolini et al. |
| 2020/0243261 | A1 | 7/2020 | Berolini et al. |
| 2020/0243264 | A1 | 7/2020 | Berolini et al. |
| 2020/0243265 | A1 | 7/2020 | Berolini et al. |

FOREIGN PATENT DOCUMENTS

| | | |
|---|---|---|
| JP | H 10275745 A | 10/1998 |
| JP | 2002343677 A | 11/2002 |
| JP | 2012138391 A | 7/2012 |
| JP | 2015070144 A | 4/2015 |

OTHER PUBLICATIONS

AVX Product Information on Flexisafe MLC Chips, 2017, 1 pages.
Johnson et al., "Nonlinear Acoustic Effects in Multilayer Ceramic Capacitors," *Nations Institute of Standards and Technology*, Jan. 2013, 9 pages.
Kemet Electronics Corporation—Surface Mount Multilayer Ceramic Chip Capacitors (SMD MLCCs), Open Mode Design (FO-CAP), X7R Dielectric 16-200 VDC (Commercial and Automotive Grade), Sep. 9, 2019, 25 pages.
Kemet Corporation—Kemet Introduces FO-CAP Combining Flexible Termination With Open Mode Chip Design Technology, Aug. 2, 2011, 3 pages.
Keimasai et al., "Flex Cracking of Multilayer Ceramic Capacitors Assembled with Pb-Free and Tin-Lead Solders," *IEEE Transactions on Device and Materials Reliability*, vol. 8, No. 1, Mar. 2008, pp. 182-192.
Keimasi, Mohammadreza (Doctorate)—"Flex Cracking and Temperature-Humidity-Bias Effects on Reliability of Multilayer Ceramic Capacitors," 2007, 181 pages.
Liu, et al., "Reliability Evaluation of Base-Metal-Electrode Multilayer Ceramic Capacitors for Potential Space Applications," *Materials Science*, 2011, 19 pages (nepp,nasa.gov).
Prymak et al., "New Improvements in Flex Capabilities for MLC Chip Capacitors," *2006 Carts Conference*, Apr. 3-6, Components Technology Institute, Inc., 11 pages.
Sloka et al., "Flexure Robust Capacitors," Kemet, Jan. 2007, 12 pages.
Watkins, James Robert (Doctorate)—"Evaluating the Susceptibility of Electronic Components Assembled with Leaded Solder to Flexural Failures, with High Rate Considerations," 2008, 126 pages.
International Search Report and Written Opinion for PCT/US2020/028737 dated Aug. 7, 2020, 8 pages.

* cited by examiner

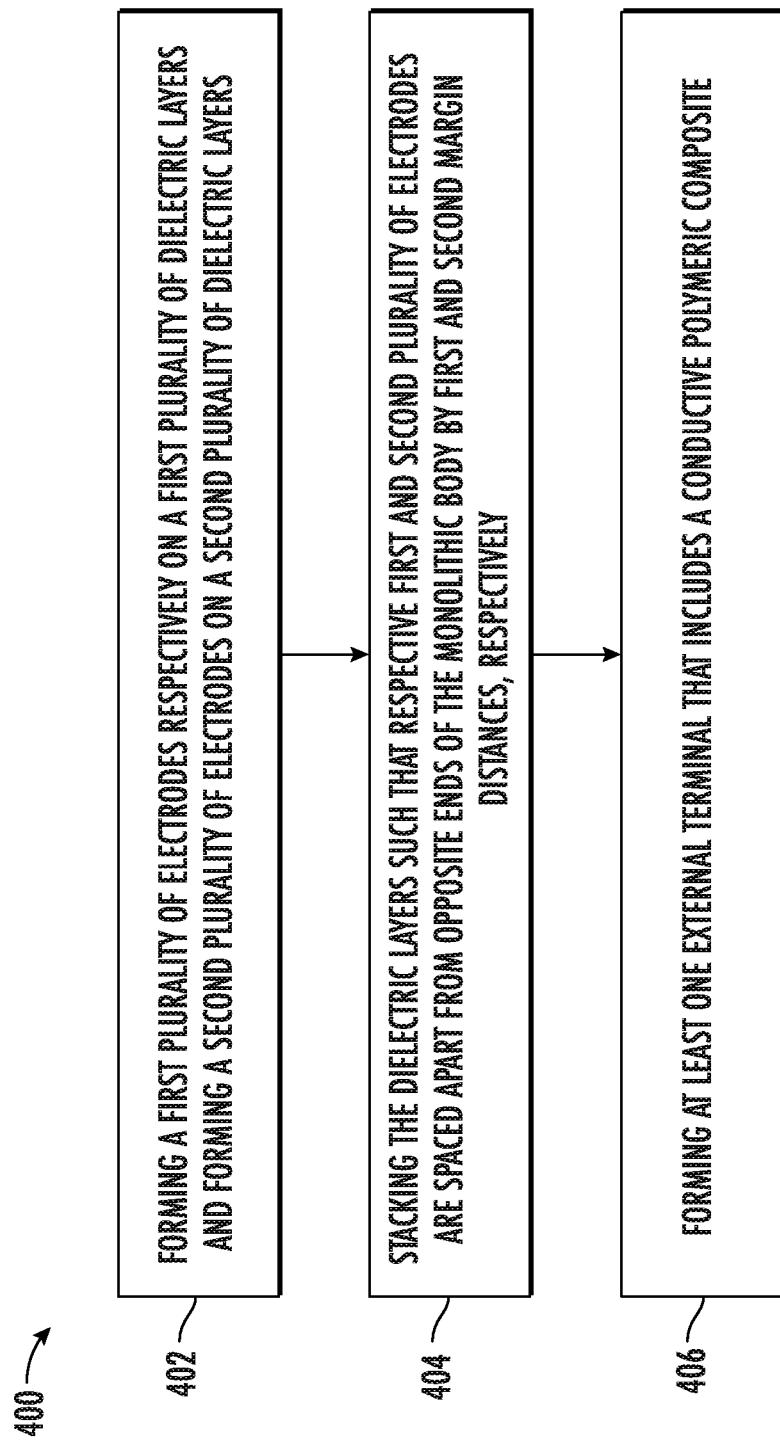

US 11,705,280 B2

MULTILAYER CAPACITOR HAVING OPEN MODE ELECTRODE CONFIGURATION AND FLEXIBLE TERMINATIONS

RELATED APPLICATION

The present application claims priority to U.S. Provisional Application Ser. No. 62/838,406, filed on Apr. 25, 2019, which is incorporated herein in its entirety by reference thereto.

FIELD OF THE INVENTION

The present subject matter generally concerns multilayer ceramic capacitors. More particularly, the present subject matter relates to a multilayer capacitor having an open mode electrode configuration and flexible terminations.

BACKGROUND OF THE INVENTION

Many modern electronic components are packaged as monolithic devices, and may comprise a single component or multiple components within a single chip package. One specific example of such a monolithic device is a multilayer capacitor or capacitor array, and of particular interest with respect to the disclosed technology are multilayer capacitors with interdigitated internal electrode layers and corresponding electrode tabs.

Multilayer capacitors have been formed by providing individual sheets of a ceramic dielectric cut from a previously prepared extended length or tape of the ceramic material. The individual sheets are screen printed with electrode ink through multiple sets of electrode patterns. Printed sheets are then stacked in multiple layers and laminated into a solid layer often referred to as a pad. The pad may then be cut into individual multilayer components, and further processing of multilayer components may be performed, for example, sintering of the pad and terminating of the individual components. Termination of the components may include applying a metal paint so as to come into contact with selected of the previously screen painted electrodes followed by another firing to secure the metal paint termination material to the capacitor.

Multilayer components, such as capacitors, can crack from thermal stress and/or mechanical stress from bending. Such cracks can intersect electrodes near the margin of the capacitor, which can potentially cause an unwanted electrical connection between electrodes that are connected with opposite terminations. A short can then occur between the terminations of the capacitor.

SUMMARY OF THE INVENTION

In accordance with one embodiment of the present invention, a multilayer ceramic capacitor may include a monolithic body comprising a plurality of dielectric layers stacked in a Z-direction that is perpendicular to each of a longitudinal direction and a lateral direction. The monolithic body may have a first end and a second end that is spaced apart from the first end in the longitudinal direction. A first plurality of electrodes may extend from the first end towards the second end of the monolithic body. The first plurality of electrodes may be spaced apart from the second end of the monolithic body by a first margin distance. A second plurality of electrodes may extend from the second end towards the first end of the monolithic body. The second plurality of electrodes may be spaced apart from the first end of the monolithic body by a second margin distance. A first external termination may be disposed along the first end and connected with the first plurality of electrodes. A second external termination may be disposed along the second end and connected with the second plurality of electrodes. The monolithic body may have a body length in the longitudinal distance between the first end and the second end. A margin ratio between the body length and at least one of the first margin distance or the second margin distance may be less than about 10. At least one of the first external termination or the second external termination may include a conductive polymeric composition.

In accordance with another aspect of the present invention, a method for forming a multilayer ceramic capacitor may include forming a first plurality of electrodes respectively on a first plurality of dielectric layers and forming a second plurality of electrodes on a second plurality of dielectric layers. The method may include stacking the first plurality of dielectric layers and second plurality of dielectric layers in a Z-direction that is perpendicular a longitudinal direction to form a monolithic body such that the first plurality of electrodes extend from a first end of the monolithic body and are spaced apart from a second end of the monolithic body in the longitudinal direction by a first margin distance. The method may include forming a first external termination along the first end of the monolithic body that is connected with the first plurality of electrodes and forming a second external termination along the second end of the monolithic body that is connected with the second plurality of electrodes. The monolithic body may have a body length in the longitudinal distance between the first end and the second end. A margin ratio between the body length and the first margin distance may be less than about 10. At least one of the first external termination or the second external termination may include a conductive polymeric composition.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth in the specification, which makes reference to the appended Figures, in which:

FIG. 4 is a flowchart of a method for forming a multilayer ceramic capacitor according to aspects of the present disclosure.

Figure 1:
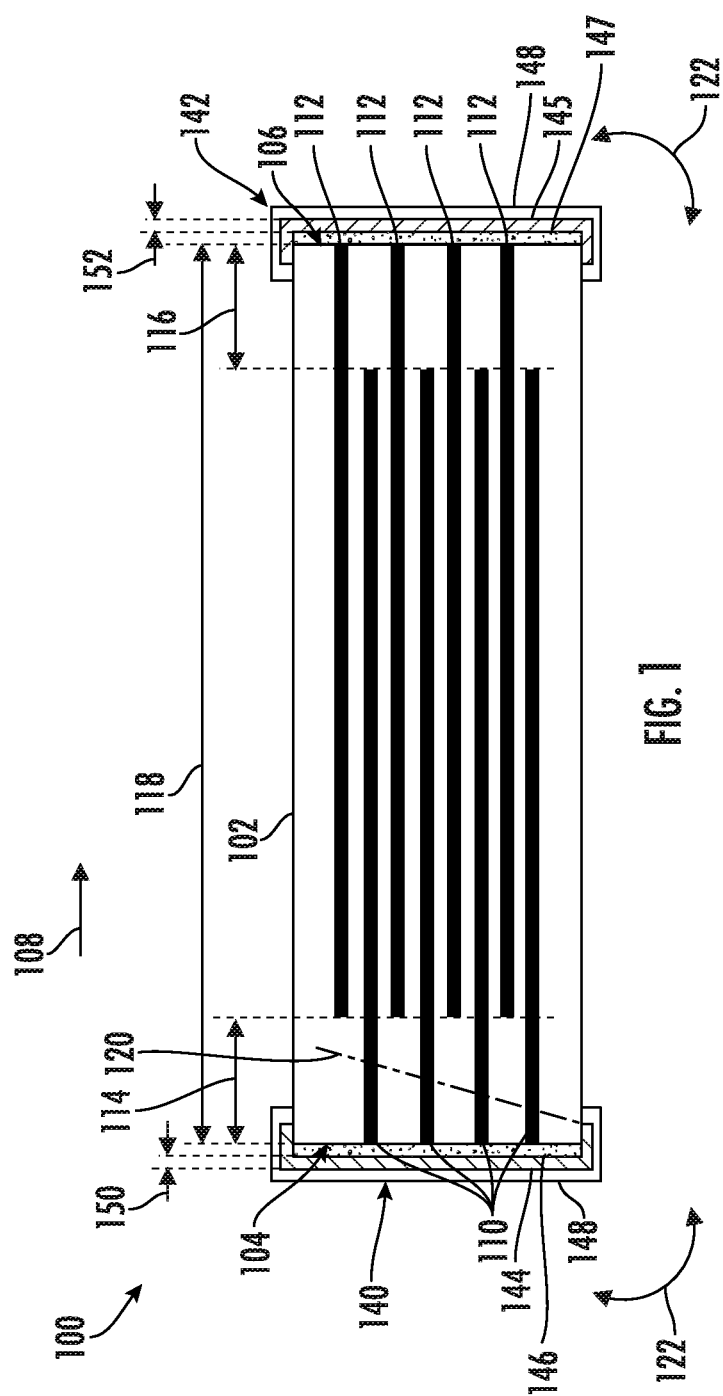
FIG. 1 illustrates a cross-section view of one embodiment of a multilayer capacitor including a compliant layer according to aspects of the present disclosure.

Repeat use of reference characters throughout the present specification and appended drawings is intended to represent same or analogous features or elements of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a multilayer ceramic capacitor that employs a combination of features configured to reduce or prevent the risk of cracking. First, the external terminations can include conductive polymeric composition (e.g., as a compliant layer) to reduce the stress experienced by the component. The conductive polymeric composition can include a polymer and dispersed conductive particles. Second, the multilayer ceramic capacitor may have a large margin distance. Because cracks typically propagate near the terminations, a large margin distance can reduce the chance that a crack will intersect the electrodes, should one occur. Thus, the combination of large margin distances and compliant external terminations results in a component that is more robust and resilient to stresses, including thermal and/or mechanical stresses caused by flexing of the surface to which the component is mounted.

In particular, the present invention is directed to a multilayer ceramic capacitor containing alternating dielectric layers and electrode layers within a single, monolithic body. The monolithic body of the capacitor may include a top surface and a bottom surface opposite the top surface. The monolithic body may also include at least one side surface that extends between the top surface and the bottom surface. The monolithic body may include at least four side surfaces that extend between the top surface and the bottom surface. In one embodiment, the monolithic body includes at least six total surfaces (e.g., one top, one bottom, four sides). For instance, the monolithic body of the capacitor may have a parallelepiped shape, such as a rectangular parallelepiped shape.

The capacitor may include a first plurality of electrodes extending from the first end towards the second end of the monolithic body. The first plurality of electrodes may be spaced apart from the second end of the monolithic body by a first margin distance. The capacitor may include a second plurality of electrodes extending form the second end towards the first end of the monolithic body and interleaved with the plurality of first electrodes. The second plurality of electrodes may be spaced apart from the first end of the monolithic body by a second margin distance. The multilayer ceramic capacitor may have a capacitor length in the longitudinal distance between the first end and the second end. A margin ratio may be formed between the capacitor length and at least one of the first margin distance or the second margin distance. In some embodiments, the margin ratio may be less than about 10, in some embodiments less than about 9, in some embodiments less than about 8, in some embodiments less than about 7, in some embodiments less than about 6, in some embodiments less than about 5, and in some embodiments less than about 4. In some embodiments, the margin ratio may be less than about 15, in some embodiments less than about 20, in some embodiments less than about 30, in some embodiments less than about 50, in some embodiments less than about 70, and in some embodiments less than about 90.

This configuration may be referred to as "open mode," in reference to the failure mode of the capacitor when subjected to excessive flexure. More specifically, when the capacitor is bent to failure, a crack may form in a "margin region" of the capacitor such that the crack does not intersect the electrodes. As a result, the capacitor may "fail open," such that the first plurality of electrodes remains electrically disconnected from the second plurality of electrodes. This may prevent an electrical connection, or "short," between the first and second plurality of electrodes.

As indicated above, one or more of the external terminations may include a conductive polymeric composition. The conductive polymeric composition may include one or more suitable polymeric materials. Examples include, for instance, epoxy resins, polyimide resins, melamine resins, urea-formaldehyde resins, polyurethane resins, phenolic resins, polyester resins, etc. Epoxy resins are particularly suitable. Examples of suitable epoxy resins include, for instance, bisphenol A type epoxy resins, bisphenol F type epoxy resins, phenol novolac type epoxy resins, orthocresol novolac type epoxy resins, brominated epoxy resins and biphenyl type epoxy resins, cyclic aliphatic epoxy resins, glycidyl ester type epoxy resins, glycidylamine type epoxy resins, cresol novolac type epoxy resins, naphthalene type epoxy resins, phenol aralkyl type epoxy resins, cyclopentadiene type epoxy resins, heterocyclic epoxy resins, etc. The polymer may include a thermoset or thermoplastic resin.

The conductive polymeric composition may include conductive particles, which may be dispersed within the polymer (e.g., as a polymer matrix) and may improve the electrical conductivity of the compliant layer. The conductive particle may be or include a metal, such as silver, gold, copper, etc. For example, conductive particles may be or include silver, copper, gold, nickel, tin, titanium, or other conductive metals. Thus, in some embodiments the compliant layer may include a silver-filled polymer, nickel-filled polymer, copper-filled polymer etc.

However, in other embodiments, the conductive particles may include a conductive ceramic material, such as an oxide of aluminum (e.g., alumina) and/or nitrides of aluminum, etc. Additional examples include oxide or nitrides of other metals, such as titanium. In some embodiments, the conductive particles may include a layer of conductive material over a base material. For instance, the conductive particles may include a layer of precious metal (e.g., silver, gold, etc.) over a base metal (e.g., copper).

The conductive particles may have a thermal conductivity that is greater than about 10 W/(m·K), in some embodiments greater than about 20 W/(m·K), in some embodiments greater than about 50 W/(m·K), in some embodiments greater than about 100 W/(m·K), in some embodiments greater than about 200 W/(m·K), in some embodiments greater than about 200 W/(m·K).

The compliant layer may have a Young's modulus that is less than about 3 GPa as tested in accordance with ASTM D638-14 at about 23° C. and 20% relative humidity, in some embodiments less than about 1 GPa, in some embodiments less than about 500 MPa, in some embodiments less than about 100 MPa, in some embodiments less than about 50 MPa, and in some embodiments less than about 15 MPa.

The compliant layer may exhibit low electrical resistance. For example, the compliant layer may exhibit a volume resistivity that is less than about 0.01 ohm-cm as tested in accordance with ASTM B193-16, in some embodiments less than about 0.001 ohm-cm, and in some embodiments about 0.0001 ohm-cm or less.

The compliant layer of the external terminations may be formed by dipping the monolithic body into a conductive polymeric composition solution to form a thick-film layer of the conductive polymeric composition.

The external terminations may include base layers formed between the monolithic body and the compliant layer. For example, the base layers may be formed over respective ends of the monolithic body, and the compliant layers may be formed over the respective base layers. The base layers may include a variety of suitable conductive materials. For example, the base layers may include copper, nickel, tin, silver, gold, etc. The base layers may be formed by dipping the monolithic body into a solution to form a thick-film layer of the base layer material. However, in other embodiments, the base layers may be formed using a suitable plating process, for example, as described below.

One or more plated layers formed over the compliant layer. For example, in some embodiments, a first plated layer may be formed over the compliant layer. A second plated layer may be formed over the first plated layer. The first and second plated layers may include a variety of suitable conductive metals, such as nickel, tin, copper, etc. For instance, in one embodiment, the first plated layer may include nickel. The second plated layer may include tin.

The plated layers may be formed by formed by a variety of plating techniques including electroplating and electroless plating. For instance, electroless plating may first be employed to deposit an initial layer of material. The plating technique may then be switched to an electrochemical plating system which may allow for a faster buildup of material.

The plating solution contains a conductive material, such as a conductive metal, is employed to form the plated termination. Such conductive material may be any of the aforementioned materials or any as generally known in the art. For instance, the plating solution may be a nickel sulfamate bath solution or other nickel solution such that the plated layer and external termination comprise nickel. Alternatively, the plating solution may be a copper acid bath or other suitable copper solution such that the plated layer and external termination comprise copper.

Additionally, it should be understood that the plating solution may comprise other additives as generally known in the art. For instance, the additives may include other organic additives and media that can assist in the plating process. Additionally, additives may be employed in order to employ the plating solution at a desired pH. In one embodiment, resistance-reducing additives may be employed in the solutions to assist with complete plating coverage and bonding of the plating materials to the capacitor and exposed leading edges of the lead tabs.

The capacitor may be exposed, submersed, or dipped in the plating solution for a predetermined amount of time. Such exposure time is not necessarily limited but may be for a sufficient amount of time to allow for enough plating material to deposit in order to form the plated termination. In this regard, the time should be sufficient for allowing the formation of a continuous connection among the desired exposed, adjacent leading edges of lead tabs of a given polarity of the respective electrode layers within a set of alternating dielectric layers and electrode layers.

In general, the difference between electrolytic plating and electroless plating is that electrolytic plating employs an electrical bias, such as by using an external power supply. The electrolytic plating solution may be subjected typically to a high current density range, for example, ten to fifteen amp/ft$^2$ (rated at 9.4 volts). A connection may be formed with a negative connection to the capacitor requiring formation of the plated terminations and a positive connection to a solid material (e.g., Cu in Cu plating solution) in the same plating solution. That is, the capacitor is biased to a polarity opposite that of the plating solution. Using such method, the conductive material of the plating solution is attracted to the metal of the exposed leading edge of the lead tabs of the electrode layers.

Prior to submersing or subjecting the capacitor to a plating solution, various pretreatment steps may be employed. Such steps may be conducted for a variety of purposes, including to catalyze, to accelerate, and/or to improve the adhesion of the plating materials to the leading edges of the lead tabs.

Additionally, prior to plating or any other pretreatment steps, an initial cleaning step may be employed. Such step may be employed to remove any oxide buildup that forms on the exposed lead tabs of the electrode layers. This cleaning step may be particularly helpful to assist in removing any buildup of nickel oxide when the internal electrodes or other conductive elements are formed of nickel. Component cleaning may be effected by full immersion in a preclean bath, such as one including an acid cleaner. In one embodiment, exposure may be for a predetermined time, such as on the order of about 10 minutes. Cleaning may also alternatively be effected by chemical polishing or harperizing steps.

In addition, a step to activate the exposed metallic leading edges of the lead tabs of the electrode layers may be performed to facilitate depositing of the conductive materials. Activation can be achieved by immersion in palladium salts, photo patterned palladium organometallic precursors (via mask or laser), screen printed or ink-jet deposited palladium compounds or electrophoretic palladium deposition. It should be appreciated that palladium-based activation is presently disclosed merely as an example of activation solutions that often work well with activation for exposed tab portions formed of nickel or an alloy thereof. However, it should be understood that other activation solutions may also be utilized.

Also, in lieu of or in addition to the aforementioned activation step, the activation dopant may be introduced into the conductive material when forming the electrode layers of the capacitor. For instance, when the electrode layer comprises nickel and the activation dopant comprises palladium, the palladium dopant may be introduced into the nickel ink or composition that forms the electrode layers. Doing so may eliminate the palladium activation step. It should be further appreciated that some of the above activation methods, such as organometallic precursors, also lend themselves to co-deposition of glass formers for increased adhesion to the generally ceramic body of the capacitor. When activation steps are taken as described above, traces of the activator material may often remain at the exposed conductive portions before and after termination plating.

Additionally, post-treatment steps after plating may also be employed. Such steps may be conducted for a variety of purposes, including enhancing and/or improving adhesion of the materials. For instance, a heating (or annealing) step may be employed after performing the plating step. Such heating may be conducted via baking, laser subjection, UV exposure, microwave exposure, arc welding, etc.

The external terminations may have a total average thickness of about 25 μm or more, such as about 35 μm or more, such as about 50 μm or more, such as about 75 or more μm. For instance, the external terminations may have an average thickness of from about 25 μm to about 150 μm, such as from about 35 μm to about 125 μm, such as from about 50 μm to about 100 μm.

The external terminations may have a maximum thickness of about 150 μm or less, such as about 125 μm or less, such as about 100 μm or less, such as about 80 μm or less. The external terminations may have a maximum thickness of about 25 μm or more, such as about 35 μm or more, such as about 50 μm or more, such as about 75 or more μm. For instance, the external terminations may have a maximum thickness of from about 25 μm to about 150 μm, such as from about 35 μm to about 125 μm, such as from about 50 μm to about 100 μm.

The base layers of the external terminations may have average thicknesses that ranges from about 3 µm to about 125 µm, or more, in some embodiments from about 5 µm to about 100 µm, and in some embodiments from about 10 µm to about 80 µm. The compliant layer may have an average thickness that ranges from about 3 µm to about 125 µm, or more, in some embodiments from about 5 µm to about 100 µm, in some embodiments from about 10 µm to about 80 µm.

In some embodiments, a ratio of the margin distances to the maximum thicknesses of the compliant layers may be greater than about 5, in some embodiments greater than about 10, in some embodiments greater than about 15, in some embodiments greater than about 20, and in some embodiments greater than about 40.

Reference will now be made in detail to the example embodiments of the multilayer capacitor. Referring now to the drawings, FIG. 1 illustrates a cross-section view of one embodiment of a multilayer capacitor 100 according to aspects of the present disclosure. The capacitor 100 may include a monolithic body 102 having a first end 104 and a second end 106 that is spaced apart from the first end 104 in a longitudinal direction 108. The monolithic body 102 may include a first plurality of electrodes 110 extending from the first end 104 towards the second end 106 of the monolithic body 102. The first plurality of electrodes 110 may be spaced apart from the second end 106 of the monolithic body by a first margin distance 114. A second plurality of electrodes 112 may extend form the second end 106 towards the first end 104 of the monolithic body 102. The second plurality of electrodes 112 may be interleaved with the plurality of first electrodes 110. The second plurality of electrodes 112 may be spaced apart from the first end 104 of the monolithic body 102 by a second margin distance 116. The monolithic body 102 may have a body length 118 in the longitudinal distance 108 between the first end 104 and the second end 106. A margin ratio may be defined between the body length 118 and at least one of the first margin distance 114 or the second margin distance 116. In some embodiments, the margin ratio may be less than about 10.

If a crack 120 were to occur due to flexing (for example as illustrated by arrows 122) of the capacitor, the crack 120 would be confined within the first or second margin distance 114, 116. The crack 120 would not intersect both the first plurality of electrodes 110 and the second plurality of electrodes 112, preventing contact between the first plurality of electrodes 110 and the second plurality of electrodes 112, which would otherwise result in electrical connection therebetween, (e.g., a "short").

The capacitor 100 may include a first external termination 140 disposed along the first end 104 and connected with the first plurality of electrodes 110. The capacitor 100 may include a second external termination 142 disposed along the second end 106 and connected with the second plurality of electrodes 112. The first external terminations 140 may include a first compliant layer 144. The first compliant layer 144 may be formed over a first base layer 146. The first base layer 146 of the first external termination 140 may be electrically connected with the first plurality of electrodes 110.

The capacitor 100 may include a second external termination 142 disposed along the second end 106 and connected with the second plurality of electrodes 112. The second external terminations 142 may include a second compliant layer 145. The second compliant layer 145 may be formed over a second base layer 147. The second base layer 147 of the second external termination 142 may be electrically connected with the second plurality of electrodes 112.

The compliant layers 144, 145 may include a conductive polymeric composition, which may include a polymer and conductive particles, for example as described above. In some embodiments, the polymer may be or include an epoxy resin. The conductive particles may be or include a metal, such as silver, gold, copper, etc.

In some embodiments, the base layers 146, 147 may be formed by dipping the monolithic body 102 to form thick-film layers. In other embodiments, the base layers 146, 147 may be plated (e.g., using electrolytic or electroless plating).

One or more plated layers 148 may be formed over the compliant layers 146, 147. For example, the plated layers 148 of the first external termination 140 may include a first plated layer formed over the compliant layer 146, 147 and a second plated layer formed over the first plated layer. The first plated layer and second plated layer (if present) may be formed of a variety of suitable metals. For example, the first plated layer may include nickel. The second plated layer may include tin.

The compliant layers 144, 145 may have respective thicknesses 150, 152, in the longitudinal direction 108. A ratio of the first margin distance 114 to the thickness 150 of the first compliant layer 144 may be greater than about 5. A ratio of the second margin distance 116 to the thickness 152 of the second compliant layer 145 may be greater than about 5.

Figure 2:
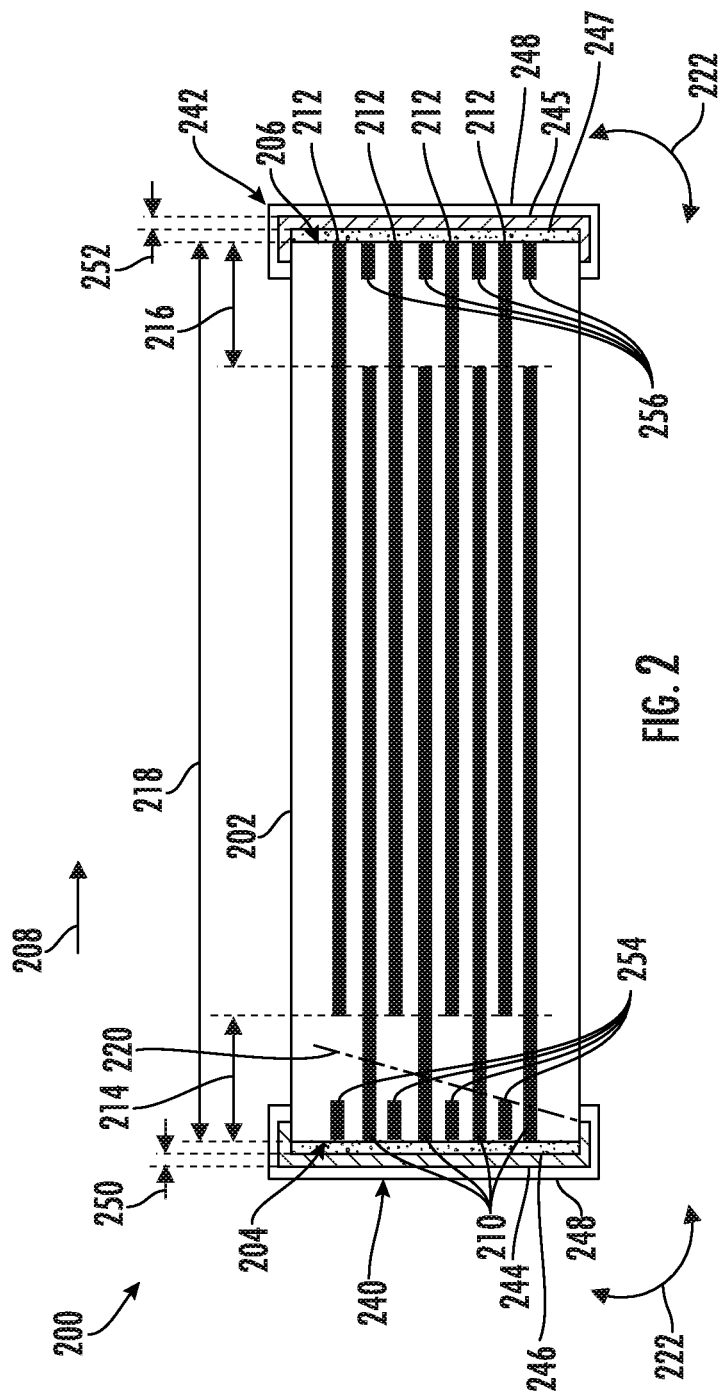
FIG. 2 illustrates a cross-section view of another embodiment of a multilayer capacitor that includes anchor tabs according to aspects of the present disclosure.

FIG. 2 illustrates a cross-section view of another embodiment of a multilayer capacitor 200 according to aspects of the present disclosure. The multilayer capacitor 200 may be generally be configured as the multilayer capacitor 100 of FIG. 1. The reference numbers of FIG. 2 may generally correspond with those of FIG. 1. The multilayer capacitor 200 may additionally include a first plurality of anchor tabs 254 at the first end 204 of the monolithic body 202 and/or a second plurality of anchor tabs 256 at the second end 206 of the monolithic body 202.

The anchor tabs 254, 256 may act as nucleation points for plating (e.g., electroless plating) for the base layers 246, 247. For example, the anchor tabs 254, 256 can facilitate the formation of secure and reliable external plating. The anchor tabs, which typically provide no internal electrical connections, may be provided for enhanced external termination connectivity, better mechanical integrity and deposition of plating materials.

Figure 3:
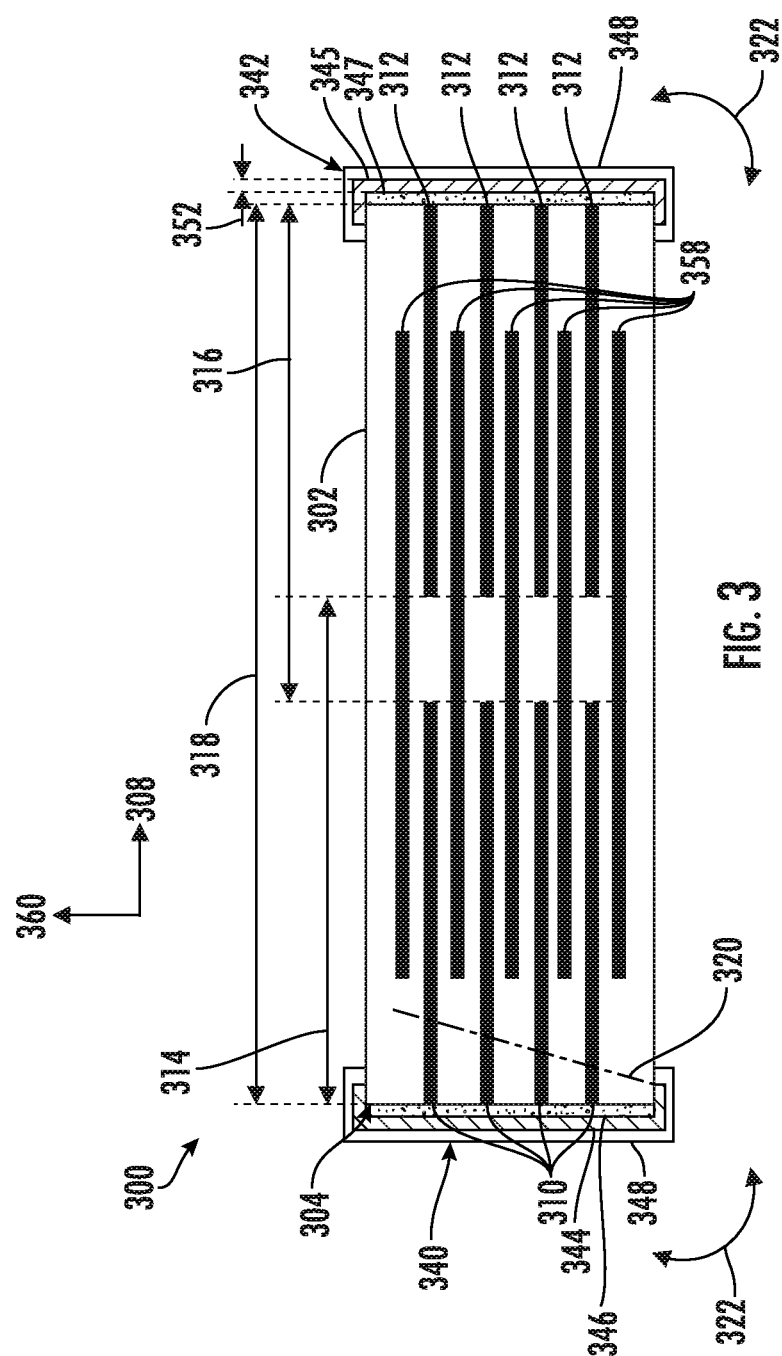
FIG. 3 illustrates a cross-section view of another embodiment of a multilayer capacitor that includes floating electrodes according to aspects of the present disclosure.

FIG. 3 illustrates a cross-section view of another embodiment of a multilayer capacitor 300 according to aspects of the present disclosure. The reference numbers of FIG. 3 may generally correspond with those of FIG. 1. The multilayer capacitor 300 may additionally include one or more floating electrodes 358. For example, a first plurality of electrode 310 may be generally aligned in a Z-direction 360 with respective electrodes 312 of the second plurality of electrodes 312. The floating electrodes 358 may be interleaved with respective aligned pairs of electrodes 310, 312.

A first margin distance 314 may be defined in the longitudinal direction 308 between the first plurality of electrodes 310 and the second end 306 of the monolithic body 302. A second margin distance 316 may be defined between the second plurality of electrodes 312 may and the first end 304 of the monolithic body 302. However, it should be understood that, in some embodiments, the capacitor may be free of floating electrodes.

FIG. 4 is a flowchart of a method 400 for forming a multilayer ceramic capacitor according to aspects of the present disclosure. In general, the method 400 will be described herein with reference to the multilayer capacitors 100, 200, 300 described above with reference to FIGS. 1 through 3. However, it should be appreciated that the disclosed method 400 may be implemented with any suitable multilayer capacitor. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

The method 400 may include, at (402), forming a first plurality of electrodes respectively on a first plurality of dielectric layers and forming a second plurality of electrodes on a second plurality of dielectric layers, for example as described above with reference to FIGS. 1 through 3.

The method 400 may include, at (404), the stacking dielectric layers such that respective first and second plurality of electrodes are spaced apart from opposite ends of the monolithic body by first and second margin distances, respectively, for example as described above with reference to FIGS. 1 through 3. More specifically, the first plurality of electrodes may extend from a first end of the monolithic body and be spaced apart from a second end of the monolithic body in the longitudinal direction by a first margin distance. A second plurality of electrodes may extend from a second end of the monolithic body and may be spaced apart from the first end of the monolithic body in the longitudinal direction by a second margin distance. A margin ratio between the body length and the first margin distance and/or second margin distance may be less than about 10.

The method 400 may include, at (406), forming external terminations along respective ends of the monolithic body that are respectively connected with the first plurality of electrodes and second plurality of electrodes. At least one of the external terminations may include a conductive polymeric composition, for example as described above with reference to FIGS. 1 through 3.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A multilayer ceramic capacitor, the multilayer ceramic capacitor comprising:
   a monolithic body comprising a plurality of dielectric layers stacked in a Z-direction that is perpendicular to a longitudinal direction, the monolithic body having a first end and a second end that is spaced apart from the first end in the longitudinal direction;
   a first plurality of electrodes extending from the first end towards the second end of the monolithic body, the first plurality of electrodes being spaced apart from the second end of the monolithic body by a first margin distance;
   a second plurality of electrodes extending from the second end towards the first end of the monolithic body, the second plurality of electrodes being spaced apart from the first end of the monolithic body by a second margin distance;
   a first external termination disposed along the first end and connected with the first plurality of electrodes, the first external termination comprising a compliant layer including a conductive polymeric composition; and
   a second external termination disposed along the second end and connected with the second plurality of electrodes;
   wherein:
   the monolithic body has a body length in the longitudinal direction between the first end and the second end and a margin ratio between the body length and at least one of the first margin distance or the second margin distance is less than about 10;
   the compliant layer has a maximum thickness in the longitudinal direction and a ratio of the first margin distance to the maximum thickness of the compliant layer is greater than about 5; and
   an average thickness of the compliant layer is greater than 10 μm.

2. The multilayer ceramic capacitor of claim 1, wherein the conductive polymeric composition comprises an epoxy resin.

3. The multilayer ceramic capacitor of claim 1, wherein the conductive polymeric composition comprises conductive particles.

4. The multilayer ceramic capacitor of claim 3, wherein the conductive particles comprise silver.

5. The multilayer ceramic capacitor of claim 1, wherein the conductive polymeric composition has a Young's modulus that is less than about 3 GPa as tested in accordance with ASTM D638-14 at about 23° C. and 20% relative humidity.

6. The multilayer ceramic capacitor of claim 1, wherein the conductive polymeric composition exhibits a volume resistivity that is less than about 0.01 ohm-cm as tested in accordance with ASTM B193-16 at about 23° C. and 20% relative humidity.

7. The multilayer ceramic capacitor of claim 1, wherein the first external termination further comprises a base layer formed over the first end of the monolithic body, the compliant layer formed over the base layer.

8. The multilayer ceramic capacitor of claim 7, further comprising a plurality of anchor tabs disposed within the monolithic body and at the first end of the monolithic body, the plurality of anchor tabs connected with the base layer.

9. The multilayer ceramic capacitor of claim 7, wherein the base layer comprises a conductive metal.

10. The multilayer ceramic capacitor of claim 1, wherein the first external termination further comprises at least one plated layer formed over the compliant layer.

11. The multilayer ceramic capacitor of claim 10, wherein the at least one plated layer comprises a first plated layer comprising a first conductive material and a second plated layer comprising a second conductive material, the second conductive material being different than the first conductive material.

12. The multilayer ceramic capacitor of claim 1, further comprising a floating electrode that is free of electrical connections with each of the first external termination and second external termination.

13. The multilayer ceramic capacitor of claim 1, wherein the capacitor is free of floating electrodes.

14. The multilayer ceramic capacitor of claim 1, wherein the first external termination has a total average thickness in the longitudinal direction that ranges from about 25 μm to about 150 μm.

15. The multilayer ceramic capacitor of claim 1, wherein the first plurality of electrodes are interleaved with the second plurality of electrodes.

16. The multilayer ceramic capacitor of claim 1, wherein the margin ratio is within a range of 7 to 10.

17. The multilayer ceramic capacitor of claim 1, wherein the monolithic body has a top surface and a bottom surface opposite the top surface along the Z-direction, wherein the first external termination extends along the top surface and the bottom surface of the monolithic body such that the first external termination along the top surface and the bottom surface of the monolithic body is spaced apart from the second plurality of electrodes in the longitudinal direction, and wherein the second external termination extends along the top surface and the bottom surface of the monolithic body such that the second external termination along the top surface and the bottom surface of the monolithic body is spaced apart from the first plurality of electrodes in the longitudinal direction.

18. The multilayer ceramic capacitor of claim 1, wherein the second plurality of electrodes is interleaved with the first plurality of electrodes and stacked along the Z-direction.

19. The multilayer ceramic capacitor of claim 18, wherein the first external termination and the second external termination are mounted to a mounting surface such that the first plurality of electrodes and the second plurality of electrodes extend parallel to the mounting surface.

20. A method for forming the multilayer ceramic capacitor of claim 1, the method comprising: forming the first plurality of electrodes respectively on a first plurality of dielectric layers; forming the second plurality of electrodes on a second plurality of dielectric layers; stacking the first plurality of dielectric layers and second plurality of dielectric layers in the Z-direction that is perpendicular the longitudinal direction to form the monolithic body such that the first plurality of electrodes extend from the first end of the monolithic body and are spaced apart from the second end of the monolithic body in the longitudinal direction by the first margin distance and such that the second plurality of electrodes extend from the second end of the monolithic body and are spaced apart from the first end of the monolithic body in the longitudinal direction by the second margin distance; forming the first external termination along the first end of the monolithic body that is connected with the first plurality of electrodes; forming the second external termination along the second end of the monolithic body that is connected with the second plurality of electrodes; wherein: the monolithic body has the body length in the longitudinal distance between the first end and the second end, and wherein the margin ratio between the body length and at least one of the first margin distance or the second margin distance is less than about 10; and at least one of the first external termination or the second external termination comprises the conductive polymeric composition.

21. The method of claim 20, wherein the conductive polymeric composition comprises an epoxy resin and conductive particles.

22. The method of claim 20, wherein the conductive polymeric composition has a Young's modulus that is less than about 3 GPa as tested in accordance with ASTM D638-14 at about 23° C. and 20% relative humidity.

23. The method of claim 20, wherein the conductive polymeric composition exhibits a volume resistivity that is less than about 0.01 ohm-cm as tested in accordance with ASTM B193-16 at about 23° C. and 20% relative humidity.

24. The method of claim 20, wherein forming the first external termination comprises forming a base layer formed over the first end the monolithic body, forming a compliant layer that comprises the conductive polymeric composition over the base layer, and plating at least one plated layer over the compliant layer.

25. The method of claim 24, further comprising forming a plurality of anchor tabs within the monolithic body and disposed at the first end of the monolithic body, the plurality of anchor tabs connected with the base layer.

26. The method of claim 24, wherein plating the at least one plated layer comprises plating a first plated layer comprising a first conductive material and plating a second plated layer comprising a second conductive material, the second conductive material being different than the first conductive material.

27. The method of claim 20, further comprising forming a floating electrode within the monolithic body, the floating electrode being free of electrical connections with each of the first external termination and second external termination.

28. The method of claim 20, wherein the first external termination has a total average thickness in the longitudinal direction that ranges from about 25 µm to about 150 µm.

29. The method of claim 20, wherein forming the first external termination comprises forming a compliant layer that comprises the conductive polymeric composition, the compliant layer having an average thickness that ranges from about 3 µm to about 125 µm.

30. A multilayer ceramic capacitor, the multilayer ceramic capacitor comprising:
a monolithic body comprising a plurality of dielectric layers stacked in a Z-direction that is perpendicular to a longitudinal direction, the monolithic body having a first end and a second end that is spaced apart from the first end in the longitudinal direction;
a first plurality of electrodes extending from the first end towards the second end of the monolithic body, the first plurality of electrodes being spaced apart from the second end of the monolithic body by a first margin distance;
a second plurality of electrodes extending from the second end towards the first end of the monolithic body, second plurality of electrodes being spaced apart from the first end of the monolithic body by a second margin distance;
a first external termination disposed along the first end and connected with the first plurality of electrodes, the first external termination comprising a first compliant layer including a conductive polymeric composition, the first compliant layer having a maximum thickness in the longitudinal direction; and
a second external termination disposed along the second end and connected with the second plurality of electrodes;
wherein a ratio of the first margin distance to the maximum thickness of the first compliant layer is greater than about 5; and
wherein an average thickness of the compliant layer is greater than 10 µm.

* * * * *